(12) United States Patent
Walter

(10) Patent No.: US 7,182,492 B1
(45) Date of Patent: Feb. 27, 2007

(54) LICENSE PLATE SYSTEM HAVING ENHANCED ILLUMINATION

(76) Inventor: Robert Louis Walter, 19361 Lake Chabot Rd., Castro Valley, CA (US) 94546

( * ) Notice: Subject to any disclaimer, the term of this patent is extended or adjusted under 35 U.S.C. 154(b) by 430 days.

(21) Appl. No.: 10/745,362

(22) Filed: Dec. 22, 2003

(51) Int. Cl.
*B60Q 1/56* (2006.01)
(52) U.S. Cl. ............... 362/497; 362/330; 362/603; 362/612; 40/205; 40/546
(58) Field of Classification Search ........... 362/497, 362/330, 603, 612; 40/204–206, 546
See application file for complete search history.

(56) References Cited

U.S. PATENT DOCUMENTS

| | | | | |
|---|---|---|---|---|
| 1,401,731 | A * | 12/1921 | Reimann | 40/204 |
| 2,579,230 | A * | 12/1951 | Giboney | 40/204 |
| 2,689,948 | A * | 9/1954 | Rothman | 362/497 |
| 3,921,324 | A * | 11/1975 | Flannery | 362/497 |
| 3,973,342 | A * | 8/1976 | Gubela | 40/582 |
| 4,975,808 | A * | 12/1990 | Bond et al. | 362/31 |
| 5,005,108 | A * | 4/1991 | Pristash et al. | 362/31 |
| 5,008,783 | A * | 4/1991 | Mastuoka | 362/497 |
| 5,150,960 | A * | 9/1992 | Redick | 362/497 |
| 5,151,679 | A * | 9/1992 | Dimmick | 340/326 |
| 5,262,225 | A * | 11/1993 | Wilson et al. | 428/203 |
| 5,521,799 | A * | 5/1996 | VerKamp | 362/497 |
| 5,613,751 | A * | 3/1997 | Parker et al. | 362/31 |
| 5,640,792 | A * | 6/1997 | Smith et al. | 40/546 |
| 5,887,968 | A * | 3/1999 | Logan | 362/241 |
| 5,895,115 | A * | 4/1999 | Parker et al. | 362/511 |
| 5,969,343 | A * | 10/1999 | Nakamura et al. | 250/227.31 |
| 6,000,812 | A * | 12/1999 | Freeman et al. | 362/249 |
| 6,027,235 | A * | 2/2000 | Chen | 362/497 |
| 6,139,163 | A * | 10/2000 | Satoh et al. | 362/31 |
| 6,158,882 | A * | 12/2000 | Bischoff, Jr. | 362/488 |
| 6,250,767 | B1 * | 6/2001 | Kusafuka et al. | 362/31 |
| 6,471,379 | B2 * | 10/2002 | Bucher et al. | 362/497 |
| 6,582,103 | B1 * | 6/2003 | Popovich et al. | 362/307 |
| 6,618,104 | B1 * | 9/2003 | Date et al. | 349/86 |
| 6,726,348 | B2 * | 4/2004 | Gloisten | 362/372 |
| 6,779,914 | B2 * | 8/2004 | Katsuo et al. | 362/497 |
| 6,799,860 | B2 * | 10/2004 | Nakaoka et al. | 362/31 |
| 2001/0036068 | A1 * | 11/2001 | Suzuki et al. | 362/31 |
| 2002/0140348 | A1 * | 10/2002 | Takeuchi et al. | 313/581 |

* cited by examiner

*Primary Examiner*—John Anthony Ward
*Assistant Examiner*—Jason Moon Han
(74) *Attorney, Agent, or Firm*—Robert Samuel Smith

(57) ABSTRACT

A license plate system for motorcycle, car, truck or boat including a row of lights supported along an edge of a clear plastic channel so that light from the row enters the interior of the pane through an edge surface of the panel. The front surface of the panel has an area that is textured to form the alpha-numeric characters of the license. The panel is sufficiently thin (⅛ to ½ inches) so that Light from the row of lights is confined between the front and rear surfaces of the panel except an area of the front surface that is textured. Therefore the contrast between the illumination of the textured area compared to the smooth area is very pronounced.

8 Claims, 2 Drawing Sheets

LICENSE PLATE SYSTEM HAVING ENHANCED ILLUMINATION

FIELD OF THE INVENTION

This invention relates to illumination of signs by background transmission of light and particularly to adaptation of the technique to vehicular license plates.

BACKGROUND AND INFORMATION DISCLOSURE

The automobile and motor cycle markets are always looking for ways to "doll up" their vehicles. Particular attention is paid to attractive ways of illuminating features of the vehicle, especially the license plates. The first concern is that the numbers on the plate must "stand out" They must be clearly legible in the darkest of conditions.

An example of this effort is U.S. Pat. No. 5,934,798 issued Aug. 10, 1999 to Roller. Roller disclosed a lamp assembly for illumination of a vehicle license plate that includes a substrate, a plurality of emitting diodes mounted on the substrate, and a lens for directing the light.

Light from the light emitting diodes onto the license plate. A housing encases the substrate and the lens. An attachment member fixedly secures the housing to a vehicle displaying the license plate.

U.S. Pat. No. 5,700,080 issued Dec. 23, 1997 to Okuda discloses a vehicular lamp comprising a lamp body defining a lamp chamber, and a light source disposed in the lamp body. An air circulation hole is formed in a back plate of the lamp body for producing an air communication channel between the lamp chamber and the air outside the lamp arranged for preventing water from leaking into the lamp chamber.

U.S. Pat. No. 5,408,772 to Pettyjohn discloses a rectangular license plate holder for a vehicle with side columns holding printed circuit boards internally. A light, a transformer and chip are mounted in the side columns. The strength of signals received by the lights is dependent on the output of the vehicles stereo system to which the circuit boards are connected. Thus the license plate frame displays an unlimited variation of colored patterns in which various numbers of LEDs are illuminated in accordance with the strength of the outputs of the stereo system.

As these examples indicate, the market is always looking for novel attractive flashy ways to display a license number on a vehicle.

SUMMARY OF THE INVENTION

It is an object of this invention to provide means for displaying a license number on a vehicle It is a further object that the license numbers be illuminated and distinct from the background.

It is a further object that the display of license numbers be "flashy" and appealing to a market that appreciates spectacular displays.

It is a further object that the license plate be inexpensively produced.

It is a further object that the part bordering the numbers be readily replaceable at least annually.

It is a further object that the license plate not be subject to deterioration due to exposures to the weather.

This invention is directed toward a clear transparent panel, preferably plastic (rather than glass) on whose surface is etched an array of license plate numbers. A row of lights is arranged preferably along a bottom edge of the panel. The special arrangement of panel and lights with respect to the etched figures ensures that the illuminated etched figures will be very prominently displayed to a viewer viewing the broad surface of the panel.

It is a special feature of this invention that the light from the row of lights travels inside the transparent panel in a direction wherein the angle of travel of the beam inside the panel with respect to the surface of the panel (panel-air interface) is less than the "critical angle". The critical angle is the "angle of incidence" between a light beam and surface, less than which, the beam is totally reflected by the interface.

Therefore, the thickness of the panel is preferably only large enough to capture sufficient illumination from the row of lights.

The light is directed through the surface of the side edge and is transmitted through the interior of the panel to the etched area having the numbers. The rough texture finish defining the numbers on the broad surface of the license plate deflect the light to a viewer looking at the license plate so that the viewer has the sensation that the numbers are actually the source of the light. The background of the numbers is virtually invisible so that the contrast between the illuminated figures and "non-illuminated" background results in an outstanding display of the numbers.

In another embodiment of the invention, the mirror surface of a flat strip of metal is secured along at least one of the remaining three edges of the panel so that light from the row of lights is "captured" inside the panel between the mirror edges and enhances the illumination of the numbers.

In another embodiment, the panel is a pair of parallel panels. The etched areas of the number create a small gap between the two panels. The small gap constitutes a pair of parallel interfaces. The row of lights sends a beam inside each panel and the beam in each panel is reflected because of the small angles of incidence of the beams in each respective panel.

The foregoing summary has highlighted features, aspects and advantages of the present invention. The invention is further explained by the following description of what I presently believe to be the best mode for carrying out the invention illustrated by drawings to which are appended claims which define the scope of the invention.

DESCRIPTION OF A BEST MODE

Figure 1:
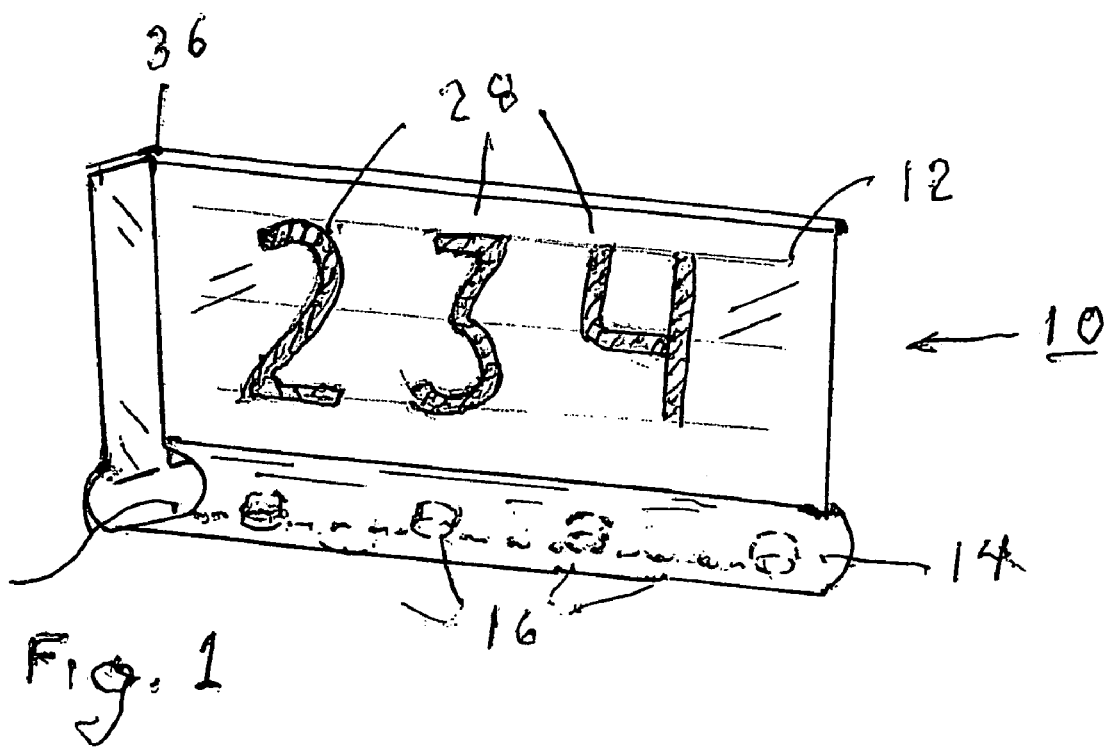
FIG. 1 shows the license plate system of this invention.
Figure 2:
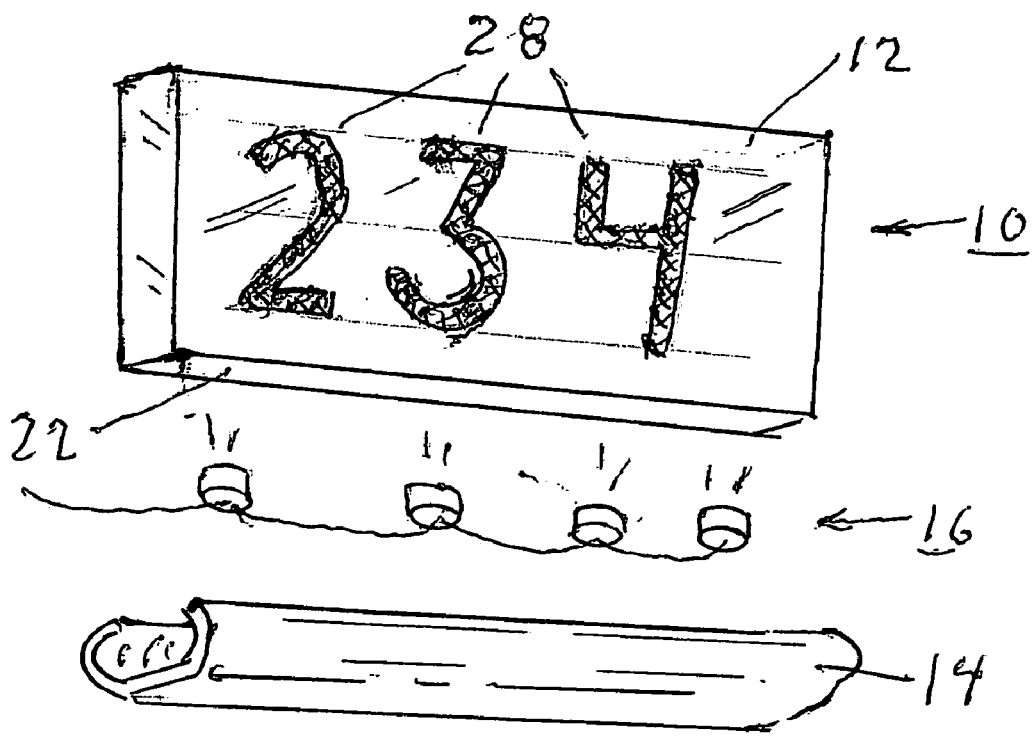
FIG. 2 is an exploded view of FIG. 1.

Turning now to a discussion of the drawings, FIG. 1 shows a license plate system assembly 10 of this invention including a panel 12, a plate support trough 14, an array of lights 16 (in phantom) arranged in the trough 14. The front surface of the panel 12 has a textured area that show the license plate numbers. FIG. 2 is an exploded view of FIG. 1.

The panel 12 is rectangular and has the approximate dimensions (length and breadth) of the typical license plate. The thickness of the panel 12 is preferably ¼ to ½ inches.

The panel 12 is a clear (transparent) medium, preferably a plastic acrylic.

The bottom edge 22 of the panel 12 has a smooth finish, i.e., not machined or saw cut.

The finish may be obtained by polishing according to well known techniques.

Alpha-numeric characters 28 are formed on the front surface of the panel by texturing the surface. Texturing is preferably formed by a high energy (laser) beam.

The row of lights 16 is arranged in the trough 14 along the bottom edge 22 of the panel 12. The trough 14 is clamped to the panel 12 and is secured to the vehicle (not shown) thereby providing convenient support for the panel 12 and the row of lights 16.

Figure 3:
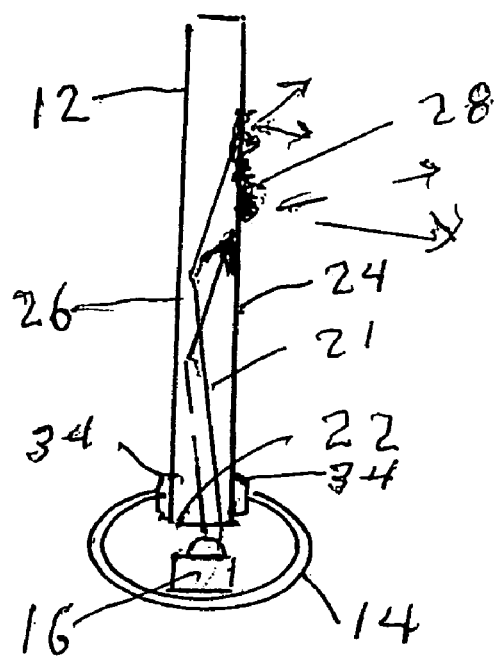
FIG. 3 shows a side view of the illuminated panel.

As shown in the side view FIG. 3, light from the row of lights 16 passes into the interior of the panel 12 by virtue of the smooth surface finish of the bottom edge surface 22.

The thinness of the panel 12, relative to the length and width provides that a light beam 21 entering the panel 12 from the row of lights 16 will generally have a small angle of reflection (less than the "critical" angle") from the broad front and rear surfaces 24, 26, of the panel and therefore will be totally reflected from every where on the front surface 24 and rear surface 26 of the panel 12 except from the textured surface 28 of the numbers. The effect to the viewer looking at the panel is that the alphanumaeric characters are self illuminated—a very dramatic effect.

As shown in FIG. 3, a resilient sealer 34 is disposed along the clamping edges of the trough 14 to prevent rain water from draining into the trough 14.

In a variation of the invention, shown in FIG. 1, a metal strip 36 is secured to at least one of the other edge surfaces of the panel 12. The surface of the metal strip 36 interfacing with the panel 12 is a mirror finish (preferably polished chrome) so that light from the row of lamps is reflected ("captured" inside the panel) until it is deflected by the textured surface 28 of the numbers into the field of view in front of the panels 12.

Figure 4:
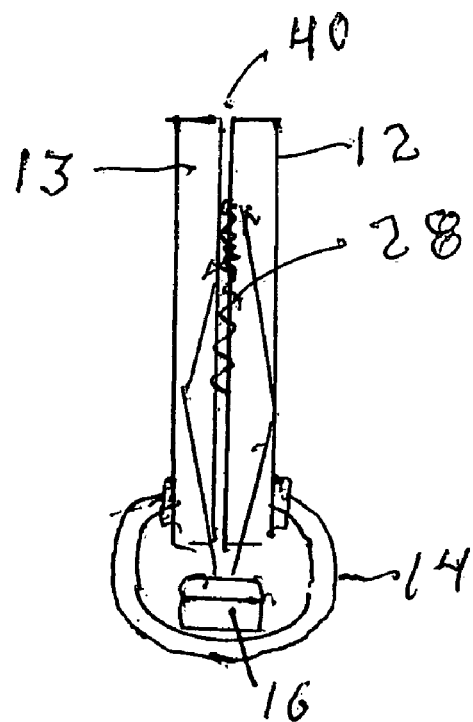
FIG. 4 shows a second clear panel positioned adjacent to the first panel to double intensity of illumination

FIG. 4 shows another version of the invention in which the license plate comprises two thin panels 12. 13. As illustrated by the side view in FIG. 4, the roughness of the textured finish of the numbers 28 is sufficiently large that a small gap 40 exists between the panels 12, 13 outside the area of the numbers and the only area where the two panels 12, 13 touch is at the numbers. The row of lamps 16 is arranged so that beams of light are directed into both panels 12, 13. The small gap 40 constitutes a pair of reflecting surfaces by virtue of the small angle of incidence of the beams in the respective panels 12, 13 thereby at least doubling the intensity of illumination of the textured area compared to the single plate arrangement.

The lamps 16 comprising the row of lights are preferably LEDs so that the row may be powered by the automobile battery-ignition system. Other types of lamps may also be used such as incandescent lamps.

The panels are made of a clear plastic. Three such materials are acetate, polyester, acrylic.

The preferred plastic of the three is acrylic because of its superior resistance to sunlight and heat and inclement weather conditions.

Variations and modifications of this invention may be contemplated after reading the specification and studying the drawings that are within the scope of the invention. I therefore wish to define the scope of my invention by the appended claims.

I claim:

1. A license plate system for a vehicle which comprises:
   one clear panel acting as the vehicle license plate, having a thickness, and having a front surface and rear surface bounded by edge surfaces;
   a smooth one of said edge surfaces being sufficiently smooth to admit light into an interior region of said panel when said light shines from outside said panel directly onto said smooth one of said edge surfaces;
   said front surface having a letter area that is rough and having a shape of alpha-numeric characters;
   a row of lights;
   said row of lights connectable to a means for energizing said row of lights;
   means for supporting said row of lights; arranged to send a beam of light directly through said smooth one of said edge surfaces into an interior region of said panel;
   a mirror surface of a flat strip of metal secured along an edge opposite said smooth one of said edge surfaces being sufficiently smooth to admit light;
   means for supporting said panel;
   said panel being sufficiently thin to provide that most of said light inside said panel forms an angle with said front and rear surfaces that is less than a critical angle of reflection thereby enhancing contrast of light between said alpha-numeric characters and a remaining area of said front panel.

2. The license plate system of claim 1 wherein said panel is one of acrylic, polyester and acetate.

3. The license plate system of claim 1 wherein said vehicle is one of an automobile, motorcycle and truck.

4. The license plate system of claim 1 wherein said means for supporting said row of lights and for supporting said panel comprises:
   a trough;
   said trough having two elongated opposing clamping surfaces permitting that said row of lights be positionable in said trough and said panel having an area adjacent said smooth edge surface clamped between said clamping surfaces,
   said row of lights positioned inside said trough whereby light from said row of lights and transmitted through said smooth end surface enters an interior of said panel and illuminates said alpha-numeric characters providing that said alpha-numeric characters are prominently lighted in contrast to a remaining area of said front and rear surfaces.

5. The license plate system 1 wherein said lights are one of incandescent lamps and LEDs.

6. The license plate system of claim 1 wherein said clear panel has a thickness selected from a range of thicknesses between ⅛ and ½ inches.

7. The license plate system of claim 1 comprising:
   another clear panel having a rear surface positioned parallel to and in close proximity to said front surface of said one clear panel;
   said rear surface of said another panel touching said rough area of alpha-numeric characters providing that a small air gap separates said one panel and said another panel; and
   light from said row of lights enters both said one and said another clear panels adjacent one another;
   said another clear panel being sufficiently thin that a light beam in said another clear panel forms an angle with front and rear surfaces of said another clear panel that is less than said critical angle providing illumination of said alpha-numeric characters is enhanced by said another panel.

8. The license plate system of claim 1 wherein said means for energizing is a battery.

* * * * *